July 13, 1937.  H. SALVATORI ET AL  2,087,120
METHOD OF MAKING WEATHERING CORRECTIONS IN SEISMIC SURVEYING
Filed June 15, 1936  5 Sheets—Sheet 1

Inventors:
Henry Salvatori
Dean Walling
BY Geo. L. Parkhurst
ATTORNEY

July 13, 1937.                H. SALVATORI ET AL                2,087,120
           METHOD OF MAKING WEATHERING CORRECTIONS IN SEISMIC SURVEYING
                         Filed June 15, 1936         5 Sheets-Sheet 2

Inventors:
Henry Salvatori
Dean Walling
BY Geo. L. Parkhurst
ATTORNEY

Fig. 5

July 13, 1937.  H. SALVATORI ET AL  2,087,120
METHOD OF MAKING WEATHERING CORRECTIONS IN SEISMIC SURVEYING
Filed June 15, 1936  5 Sheets-Sheet 4

Inventors:-
Henry Salvatori
Dean Walling
BY
ATTORNEY

Patented July 13, 1937

2,087,120

UNITED STATES PATENT OFFICE 2,087,120

METHOD OF MAKING WEATHERING CORRECTIONS IN SEISMIC SURVEYING

Henry Salvatori, Hollywood, and Dean Walling, Bakersfield, Calif., assignors to Western Geophysical Company, Tulsa, Okla., a corporation of Delaware Application June 15, 1936, Serial No. 85,198

6 Claims. (Cl. 181—0.5)

This invention pertains to the art of determining the position and slope of sub-surface geological formations, ordinarily known as geophysical prospecting. More specifically, it applies to that branch of the art known as seismic surveying, in which seismic waves artificially produced near the surface of the earth are refracted or reflected from sub-surface formations, detected by seismometers and suitably amplified and recorded. By a knowledge of the laws governing the refraction and reflection of the waves, the amplified record produced by the seismometers can be interpreted, and the depths and/or dips of the formations determined from the times of arrival of these waves.

The accompanying drawings illustrate the principles to be explained. They form a part of this specification and are to be read in conjunction with it. In these drawings, the same reference symbols in different figures refer to corresponding features.

In connection with all of these figures only the paths of those seismic waves which are of importance in connection with this invention are shown, although it is well known that seismic waves sent out by the detonation of an explosive charge in the earth are propagated in all directions and traverse a great variety of paths.

In the ordinary method of seismic surveying by the reflection method, a shot hole 10 is drilled through the top or weathered layer 11 (shown shaded in Figure 1) to some arbitrary point A in the formation below. Seismometers $S_1$ and $S_2$ are placed on or just below the surface of the ground X—X'. Hereinafter the seismometers will be spoken of as "near" the surface of the ground and it will be understood that this includes seismometers placed on the surface of the ground as well as seismometers buried at various depths. More than two seismometers can be and commonly are used and are usually disposed in line with each other and with the shot hole. An explosive charge is detonated in shot hole 10 at point A and the instant of detonation is recorded on the oscillographic recorder R in the conventional manner. Recorder R will usually contain the customary amplifiers. The response of the seismometers to the refracted waves (which travel roughly along paths such as A—12—13 and A—14—15), and reflected waves from formations such as Y—Y' (which travel along paths such as $P_1$ and $P_2$) are amplified and recorded by recorder R. The reflected waves impinging on the various seismometers give traces on the oscillograph record which can be distinguished from the other waves, as is well known to the art. Knowing the distances from the shot hole to the seismometers, the times of arrival of the reflected waves after the explosion, and the velocities of the waves in the subsurface formations, the distances from the surface of the ground to the reflecting points on the sub-surface formations (such as points 16 and 17 on the formation Y—Y') can be determined. From Figure 1 it can be seen that there is a small difference in length between paths $P_1$ and $P_2$. This difference in length of path gives a corresponding difference in the arrival times of the reflected waves. From this difference in time read off the record and the knowledge of the distances of the seismometers from the shot hole, the dip of the reflecting formation Y—Y' can be computed.

This difference in time known as the "move-out" is composed, in the absence of complications, of two parts: first, that due to the normal excess in the length of path $P_2$ over that of path $P_1$ when the reflecting bed is horizontal, and second, that due to a change in the relative lengths of $P_1$ and $P_2$ due to the dip, if any, of the reflecting stratum Y—Y'. The magnitude of the first part depends upon the depth of the reflecting stratum, the average velocity of the waves, and the distances from the seismometers to the shot point. As can be seen by study of the geometry of Figure 1, this first part (hereafter referred to as the "normal move-out") increases with increasing distance from the seismometers to the shot hole, increases with increasing distance between seismometers (usually known as the "seismometer spread"), and decreases with the increasing depth of the reflecting formation. The second part, which is the part that is used in determining the dip of the underlying formations, is small, usually of the order of a few thousandths of a second. It increases with increasing seismometer spread and with increasing angle of dip. Since the dips of underlying strata are, in many areas, of the order of one to two degrees at most, the ability to use the dip method depends entirely on the accuracy with which the few thousandths of a second additional difference in the arrival time can be determined, i. e. separated from the normal move-out.

The difference in arrival times of the reflected waves at the two seismometers may not be due solely to the above mentioned causes. Referring again to Figure 1, it will be noticed that all reflected waves arriving at either seismometer must pass finally through the weathered layer 11. The velocity of seismic waves in this layer is very much lower than in the underlying formations, so that the time of travel of the reflected waves is much greater than it would be if the high velocity formations extended to the surface. The existence of this low velocity weathered layer would give erroneous values for the computed depths of the reflecting strata if it were not relatively easy to determine the average depth of the weathered layer and compensate accordingly. However, an extremely serious difficulty in the computation of the dips of the formations enters, because the depth of the weathered layer often varies from point to point.

Figure 1:
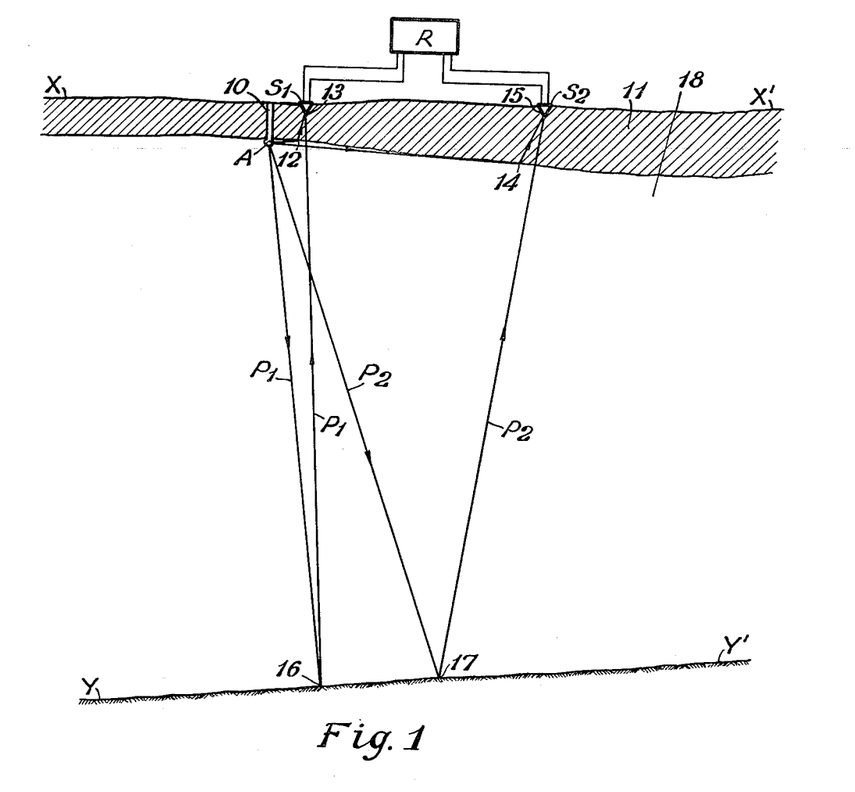
Figure 1 shows a diagrammatic vertical cross-section of a portion of the crust of the earth, showing typical geologic sections, and illustrates the ordinary method of reflection seismic surveying.

Since the move-out due to the dip of reflecting formation Y—Y' for the reflected waves received by seismometers $S_1$ and $S_2$ is of the order of thousandths of a second, it is evident that a small difference in the thickness of the weathered layer beneath these two seismometers can cause a difference in arrival times which is comparable to or even greater than that due to the dip itself. An example will make this evident. Average values of the velocity in the weathered layer and in the underlying formation are around 2000 and 7000 feet per second, respectively, in a typical region. If seismometers $S_1$ and $S_2$ are 200 and 800 feet from the shot hole 10, respectively, the normal move-out of the waves reflected from a flat stratum 4000 feet below the seismometers will be 0.00535 second. If the bed is not flat, but dipping at a quite usual value of 2°, the additional difference in arrival times of the waves received by seismometers $S_1$ and $S_2$ will be 0.00297 second. If it should happen that the depth of the weathered layer 11 is ten feet greater under seismometer $S_2$ than under seismometer $S_1$, the difference in arrival times due to this ten foot difference will be $$10\left(\frac{1}{2000} - \frac{1}{7000}\right)$$

or 0.00357 second. Thus, the difference in arrival time which would be attributed to dip would be (0.00297+0.00357), or 0.00654 second, if the weathered layer were assumed to be uniform in thickness. The time difference would correspond to a dip of 4½°. A difference of only 10 feet in the thickness of the weathered layer thus produces an error of 125% in the dip calculations under these typical circumstances. Obviously such an error would make the dip calculations of little or no practical value. It thus becomes very necessary to know accurately the incremental arrival time due to the difference in thickness of the weathered layer under the seismometers in order to obtain a satisfactory dip determination.

An object of this invention is to furnish methods and means whereby the incremental arrival times of reflected waves due to variations in thickness of weathered layer can be determined accurately in all cases, particularly in operations restricted to the determination of the dips of sub-surface strata, i. e. in "dip shooting". This incremental arrival time due to variation in the thickness of the weathered layer will be referred to hereafter as the "weathering correction". An advantage of our procedure is that only two seismometers need be used and that the records used to compute the depths and/or dips of the sub-surface strata can be used to find the weathering correction. An additional advantage is that all seismometers used in the determination of the weathering correction are also of use in obtaining records of reflected waves useful in determining the profile of the sub-surface structure. Another advantage is that we give alternative independent methods whereby the values of the weathering correction can be checked against each other. Further advantages will become apparent as the detailed description of our invention proceeds.

Figure 2:
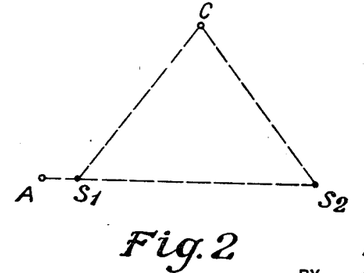
Figure 2 is a plan view illustrating a prior art set-up for making time corrections.
Figure 3:
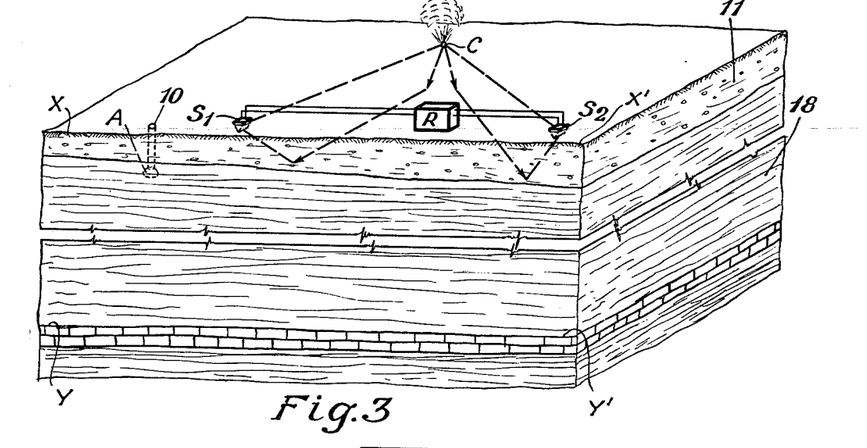
Figure 3 is an isometric diagram corresponding to Figures 1 and 2 and illustrates one prior art method for obtaining necessary timing corrections for the reflection records.

One method, already well known in the art, used to obtain the weathering correction is illustrated in Figures 2 and 3. A charge of explosive C is placed slightly below the surface of the ground at a point chosen so that the distance C—$S_1$ is equal to the distance C—$S_2$. When the charge C is detonated, the first wave reaching seismometer $S_1$ travels down through the weathered layer 11 until it strikes the higher velocity structure 18 at the critical refracting angle, passes along this medium, and is refracted up again to strike seismometer $S_1$. Another wave simultaneously travels along a similar path to seismometer $S_2$. The distance travelled in the higher velocity medium is substantially the same for the two paths, and if the velocity of the refracted waves in the high velocity medium 18 were exactly equal for paths C—$S_1$ and C—$S_2$, any difference in times of arrival of the waves at seismometers $S_1$ and $S_2$ would be due to a difference in thickness of the weathered layer 11 at the two instruments, and the difference in arrival times would be a measure of the weathering correction. Unfortunately, field tests have definitely shown that this velocity of travel in the high velocity medium is not always the same, i. e., that shots placed at varying distances from the line of seismometers but equidistant from the end instruments give different weathering corrections. This method has the further disadvantage that large charges of dynamite must be used to obtain an explosion near the surface of sufficient magnitude to produce refracted waves at seismometers $S_1$ and $S_1$.

Figure 4:
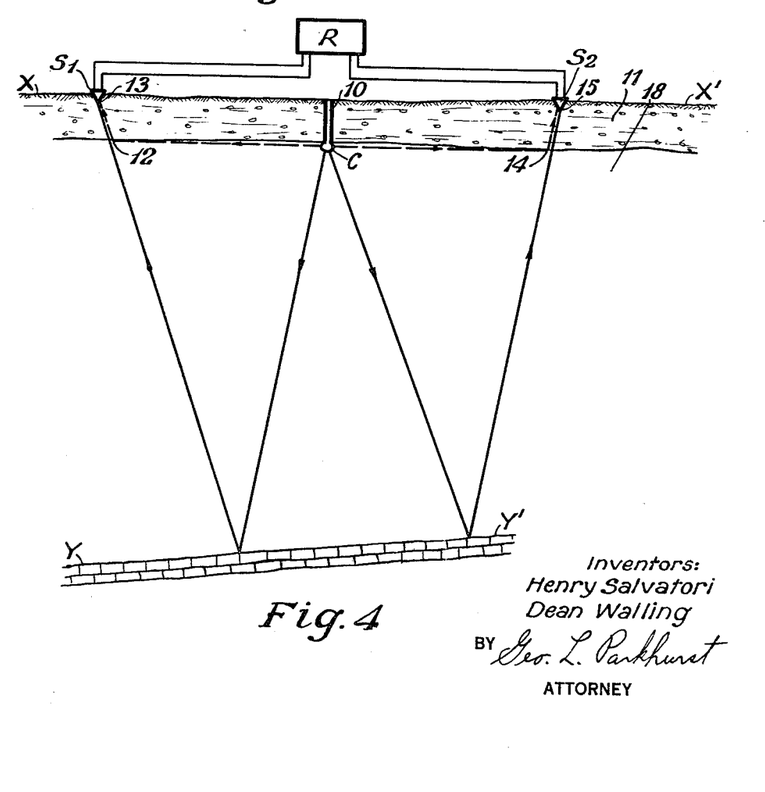
Figures 4 and 5 are diagrammatic cross-sections similar to Figure 1, illustrating alternative methods in the prior art for obtaining or eliminating the timing corrections.

A second method used to find the weathering correction, well known to all skilled in the art, makes use of the set-up shown in Figure 4. This in effect is the same general arrangement as shown in Figures 2 and 3 except that the seismometers have been placed at equal distances on opposite sides of the shot hole so that a charge placed in shot hole 10 used in the reflection work replaces charge C of Figures 2 and 3. The difference in arrival times of the first refracted waves from the explosion of charge A reaching seismometers $S_1$ and $S_2$ is taken as the weathering correction. This method has the same disadvantage as that described in the preceding paragraph since it has been proved that the velocity of the refracted waves in the lower section is not the same for the paths C—12—13 and C—14—15. However, this method has the advantage that the weathering correction can be read off the same records used for the reflection calculations. This arrangement of seismometers relative to the shot point is known as a "split-spread".

The inverse arrangement of a split-spread is described by McCollum and McGhee in U. S. Patent No. 2,001,429 as a method of eliminating the weathering correction. In this method, two shot holes are drilled into the high velocity medium 18. A seismometer is placed at a point intermediate the holes. A reflection seismogram is taken from a shot in each of holes 10 and 19 shown in Figure 5. The principle lying behind the elimination of the weathering correction is that the reflected waves reaching seismometer $S_3$ from either shot traverse substantially the same path through the weathered layer, so that there can be no difference in arrival time due to difference in thickness of weathered layer. Two methods are used to obtain the dip time. The simpler does not make use of the two extra instruments $S_4$ and $S_5$. From the two reflection records obtained by shots at A and B the difference in time for the reflected waves to traverse the paths A—20—$S_3$ and B—21—$S_3$ is determined. This is the dip time. This method has a very serious difficulty, realized by McCollum and McGhee, that there must be a certainty that the reflections used in obtaining the dip time are from the same bed. Often the correlation of the records to this degree is impossible. In fact, the chief advantage in the ordinary method of dip shooting is that no correlation of reflections is required.

Figure 5:
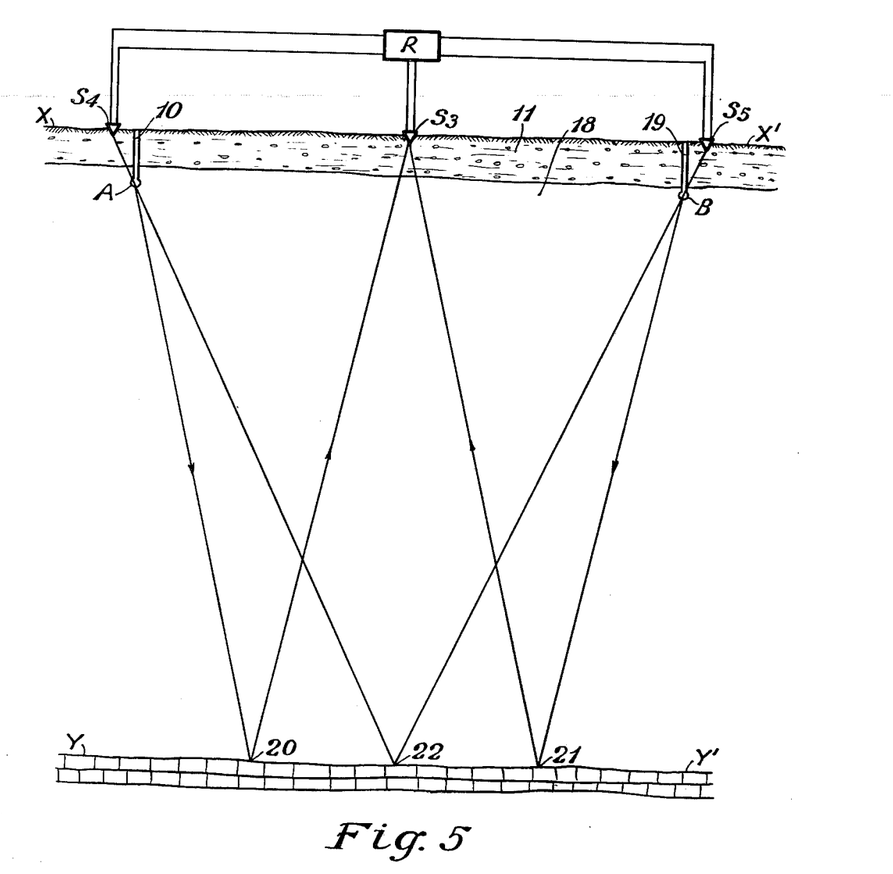

The second method given makes use of all three seismometers shown in Figure 5. The time difference between paths A—20—$S_3$ and B—21—$S_3$ is found by a combination of the time for a wave to propagate from the shot to the seismometer adjacent the shot hole and the difference in times for the reflected wave to reach the center and far seismometer as computed from records with shots at A and B respectively. The correlation difficulty is eliminated. However, other difficulties are present. In the first place, the arrangement of seismometers is very inflexible. The intermediate seismometer $S_3$ must be placed roughly half way between the two holes. If it is placed closer to one hole than to the other, the accuracy of the computations from the record using the short spread will be less than that of those using the long spread, so that to secure a comparable accuracy in all determinations the distance $S_3$—$S_5$ should be approximately equal to the distance $S_3$—$S_4$. This means that there is an interval from the active shot hole to the first seismometer used for the reflection data equal to the seismometer spread. Consequently, there is a much larger normal move-out than if the same spread were used with the first reflection seismometer close to the shot hole, as was taken up in the previous discussion of move-out and dip time. Since the normal move-out tends to mask the dip time under all circumstances, it is evident that this arrangement makes accurate interpretations of the records more difficult than would be the case if the same seismometer spread were used with the first seismometer much closer to the shot hole. Furthermore, when several seismometers are connected to each oscillograph element as is often desirable, it is essential that the reflection move-out times between the seismometers actuating any single oscillograph element be made as small as possible, as otherwise the reflected impulses instead of aiding each other would tend to interfere. Consequently, as the reflection normal move-out times between two seismometers spaced a given distance apart increases with the distance from the shot point, it can be readily seen that having arrived at an optimum distance between seismometers for best interference of direct waves, the total distance of these seismometers from the shot point cannot be increased beyond a certain amount. Thus, there is another very important reason for having the first seismometer as close as possible to the shot point which cannot be done with the inflexible set-up required by the McCollum and McGhee method.

As has been discussed, the intermediate seismometer must be approximately midway between the holes in the McCollum and McGhee method. Similarly, the seismometers $S_4$ and $S_5$ adjacent the shot holes must be placed just slightly outside and immediately adjacent the shot holes in order that the direct wave paths from shots to instruments coincide with those used in the derivation of the equations pertaining to this method. This means that the available reflection spread is limited to half the distance between shot holes. In actual practice it is difficult to ascertain just what spread will give the best results, and spreads of widely differing magnitudes are required in the same territory. With the McCollum and McGhee method, if the spread chosen did not give good reflection records from both shot holes, a new hole would have to be drilled in order to change the spread. Again, a factor apparently not considered by McCollum and McGhee is that by using their reflection spread so far from the shot hole, the surface waves, travelling slower than the reflected waves but through lesser distances, can (and in practice often do) arrive at the spread at the same time the reflected waves are being received, thus superimposing on the record a high amplitude, low frequency component. Although filters can be used to suppress these waves to some extent, considerable trouble in interpreting the records is still experienced if the two waves arrive at a seismometer at about the same time. Moving the whole spread of seismometers closer to the shot point so that the surface waves passed before the reflections are received is impossible if the McCollum and McGhee method is used. On the other hand, they cannot move the spread out farther, so that the surface waves will be received later than the reflected waves because the holes have already been drilled. Furthermore, even if a new hole is drilled to move out the spread, the spread itself (half the distance between holes) is increased. This gives rise to two difficulties: first, the reflecting beds are very often short, so that if the spread is increased there may be no extension of the reflecting bed to the right point to give a reflection at the end seismometer. This is often experienced in the field when too great a spread is used. Second, the ease with which the arrival of a reflection can be distinguished on the traces from the seismometers depends upon the difference in the arrival times on the record. If this difference is small, the reflection arrival can be checked from trace to trace, as is evident from Figures 7 and 8.

If on the other hand, the difference in arrival times is large, it is difficult to know whether the same reflection is being identified on the various oscillograph traces or whether the first breaks of reflections from closely adjoining reflecting beds are being mistaken for reflections from one bed. This large difference in arrival time occurs when the dip of the beds is too great for the spread used, and cannot be predetermined. Since the spread is fixed in the McCollum and McGhee method by the distance between shot holes, a new hole must be drilled to decrease the spread if the dip is found too large to give interpretable records. The obvious conclusion from the facts given above is that there must be flexibility in the placement of the seismometers if satisfactory records are to be obtained in all areas, and that the McCollum and McGhee method does not have the inherent flexibility necessary. As all skilled in the art realize, the seismometer spacing from shot hole is a very important factor in securing good records and the field men must have complete freedom in changing the seismometer set-up relative to the shot point if the first records obtained are unsatisfactory.

It is very desirable in dip shooting to have a check on the slopes computed from data obtained by the use of adjacent shot holes. This cannot be done if the method just discussed is used, since the reflection records from both holes are needed to compute one value of dip. If good reflections are not obtained from both holes (and this is often the case in difficult territory) no value of dip can be computed at all.

In the McCollum and McGhee method, the time for a reflected wave travelling path A—22—B—S₅ (Figure 5) to travel the path B—S₅ is determined by exploding charge B and recording the time of explosion and the instant of arrival of the direct wave at seismometer S₅. This presents a difficulty often encountered in shooting, namely, the difficulty of obtaining the instant the seismic waves were radiated from charge B. Usually what is recorded is the instant the blasting cap was ignited, which (as tests have indicated) may be followed a full thousandth of a second by the formation of the pressure wave. This interval would depend upon the speed of burning of the explosive, speed of the pressure wave in the tamping, shattering of the hole, and the size of the hole.

The method of the present invention eliminates the difficulties mentioned in connection with the previous methods. Our method is best described in connection with Figure 6. Two shot holes 10 and 19 are drilled some distance apart to a depth preferably greater than that of the weathered layer 11. The distance between the two shot holes will vary with the requisite accuracy of the survey, and for normal areas can suitably be anything from 400 to 3000 feet, although at least 1000 feet is preferable. At least two seismometers S₁ and S₂ are placed roughly in line between the two holes. They are preferably placed at approximately equal distances from their respective adjacent shot holes, although other positions can be used without changing the method. These seismometers can be of any of the types producing electric impulses as a result of motion due to seismic waves. They are connected to separate oscillograph elements in the recorder R which will normally include the usual amplifiers.

Figure 6:
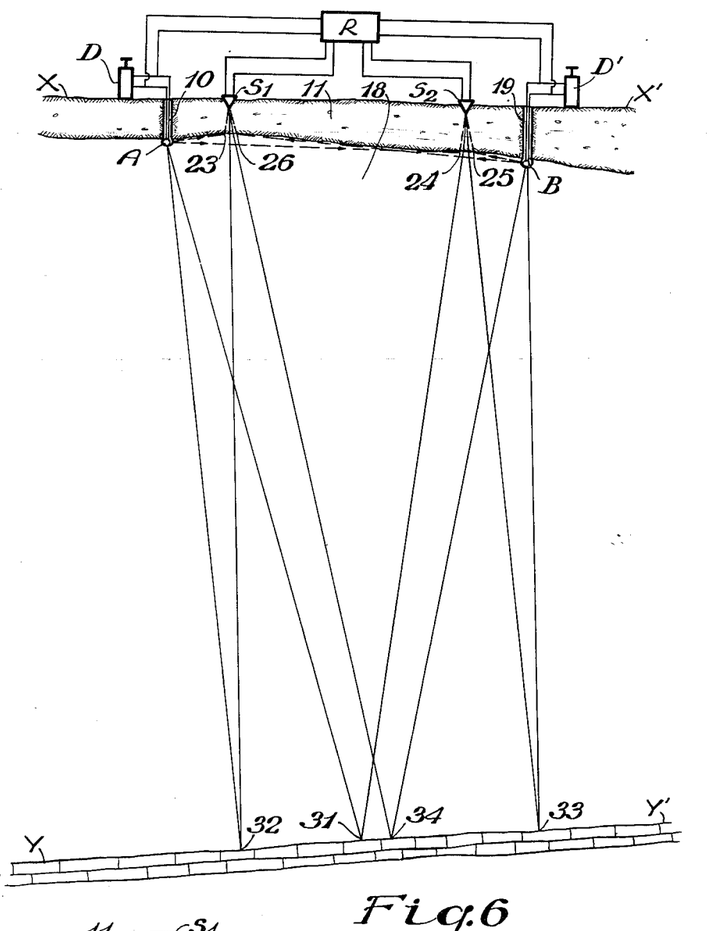
Figure 6 is a diagrammatic cross-section similar to Figure 1, showing the arrangement of instruments and shot holes used in connection with the present invention.

The procedure is as follows: A charge of explosive A is lowered into hole 10 and detonated by means of detonator D. The seismic waves resulting from the explosion are recorded by seismometers S₁ and S₂, as well as by any intervening seismometers. Then, without moving the seismometers, a second charge of explosive B is detonated in hole 19, and a similar record is made. From the two records obtained, the difference in the depths of weathered layer 11 below seismometers S₁ and S₂ respectively can be determined.

When the explosive charge A is detonated in hole 10, the first wave to reach seismometer S₁ travels through the high velocity sub-strata 18, constantly being refracted up towards the surface. The path of the wave reaching seismometer S₁ is shown in Figure 6 as A—23—S₁. Similarly, the first wave reaching seismometer S₂ is the refracted wave traversing the path A—24—S₂. From the explosion of charge B, the path of the first wave to reach seismometer S₂ is B—25—S₂, and that of the wave first reaching S₁ is B—26—S₁. The refraction of the wave at the boundary between the sub-strata 18 and the weathered layer 11 is approximately at the critical angle, so that the path of the waves in the weathered layer is nearly normal to the surface, and points 23 and 26 on the one hand and 24 and 25 on the other hand, are close together. For this reason, the length of path 23—S₁ is very nearly equal to that of path 26—S₁, and path 24—S₂ is very nearly equal to path 25—S₂. Thus, the times taken for waves to traverse paths 23—S₁ and 26—S₁ will be almost exactly the same. This also holds for the times taken for waves to traverse paths 24—S₂ and 25—S₂.

Figure 6A:
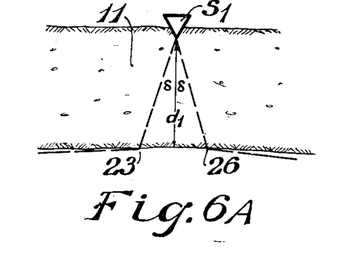
Figure 6A is a detail of Figure 6.

For a first approximation, the distance 23—24 is considered to be equal to the distance 25—26. The approximation becomes exact when the weathering is the same below the two seismometers. The angle of refraction to the surface is always practically the same at both stations. As seen from Figure 6A, the distance 23—26 is equal to twice the thickness ($d_1$) of the weathered layer below seismometer S₁ multiplied by the tangent of the angle ($\delta$) the refracted wave makes with the vertical. Similarly, the distance 24—25 is twice the distance $d_2$ (thickness of the weathered layer under seismometer S₂) multiplied by the tangent of the same angle, so 23—26 is equal to 24—25 when $d_1$ is equal to $d_2$. Points A, 23, 26, 24, 25 and B are practically in a straight line. The distance 26—24 is common to both paths A—24—S₂ and path B—26—S₁, so that 23—24 (equal to 23—26 plus 26—24) must be equal to 26—25 (equal to 24—25 plus 26—24). However, a difference in weathering of 10 feet under the seismometers, which is about the maximum magnitude commonly encountered, will give a difference of length between the two paths (23—24 and 26—25) of around 3 feet for the usual refraction angle ($\delta$) of around 20°. The time difference corresponding to this space difference is around 0.0004 second (7000 feet per second velocity), which is well within the limits of allowable error. This error can, however, be eliminated by successive approximation, as will be discussed later.

The weathering correction $\Delta t$ is given by the following analysis. In this analysis T with appropriate subscripts indicates the time for a wave to traverse the path indicated by the subscript. $V_1$ is the seismic velocity in the weathered layer 11 and $V_2$ is the corresponding velocity in the underlying formation 18.

$$\Delta t = T_{d_2} - T_{d_1} = (T_{25-S_2} - T_{23-S_1}) \cos \delta,$$

where $\sin \delta = \dfrac{V_1}{V_2}$ (1)

$$T_{A-23-S_1} = T_{A-23} + T_{23-S_1} \quad (2)$$
$$T_{A-24-S_2} = T_{A-24} + T_{24-S_2} \quad (3)$$
$$T_{B-25-S_2} = T_{B-25} + T_{25-S_2} \quad (4)$$
$$T_{B-26-S_1} = T_{B-26} + T_{26-S_1} \quad (5)$$

and, as discussed above:

$$T_{26-S_1} = T_{23-S_1} \quad (6)$$
$$T_{24-S_2} = T_{25-S_2} \quad (7)$$
$$T_{23-24} = T_{26-25} \quad (8)$$

Substituting (6) and (7) in Equations (2) to (5) and expanding:

$$T_{A-23-S_1} = T_{A-23} + T_{23-S_1} \quad (2)$$
$$T_{A-24-S_2} = T_{A-23} + T_{23-24} + T_{24-S_2}$$
$$= T_{A-23} + T_{23-24} + T_{25-S_2} \quad (9)$$
$$T_{B-25-S_2} = T_{B-25} + T_{25-S_2} \quad (4)$$
$$T_{B-26-S_1} = T_{B-25} + T_{26-25} + T_{26-S_1}$$
$$= T_{B-25} + T_{26-25} + T_{23-S_1} \quad (10)$$

And, upon substitution of Equation (1):

$$T_{A-24-S_2} - T_{A-23-S_1} = T_{25-S_2} - T_{23-S_1} + T_{23-24}$$
$$= \frac{\Delta t}{\cos \delta} + T_{23-24} \quad (11)$$

$$T_{B-25-S_2} - T_{B-26-S_1} = T_{25-S_2} - T_{23-S_1} - T_{26-25}$$
$$= \frac{\Delta t}{\cos \delta} - T_{26-25} \quad (12)$$

Adding (11) and (12):

$$T_{A-24-S_2} - T_{A-23-S_1} + T_{B-25-S_2} - T_{B-26-S_1}$$
$$= 2\frac{\Delta t}{\cos \delta} + T_{23-24} - T_{26-25} \quad (13)$$

But, from Equation (8):

$$T_{23-24} = T_{26-25}$$

So:

$$T_{A-24-S_2} - T_{A-23-S_1} + T_{B-25-S_2} - T_{B-26-S_1} = 2\frac{\Delta t}{\cos \delta}$$

$$\Delta t = \frac{(T_{A-24-S_2} - T_{A-23-S_1}) - (T_{B-26-S_1} - T_{B-25-S_2})}{2} \cos \delta \quad (14)$$

Equation (14) gives the required weathering correction in terms of the times read from the record and the refraction angle. The time quantity $(T_{A-24-S_2} - T_{A-23-S_1})$ is read from one record and the time quantity $(T_{B-26-S_1} - T_{B-25-S_2})$ is read from another record. Errors in the determination of the time of the shots thus cancel out and cannot affect the accuracy of $\Delta t$. As was previously stated, $\delta$ is around 20° and $\cos \delta$ is therefore around 0.9397. $\cos \delta$ can usually be assumed to be unity without serious error since the error will be 6% of a few thousandths of a second, which is entirely negligible.

Figure 7:
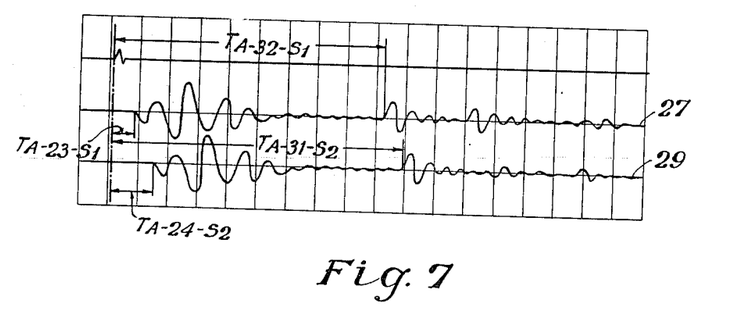
Figures 7 and 8 represent typical records from the seismometers shown in Figure 6 for shots at points A and B respectively.
Figure 8:
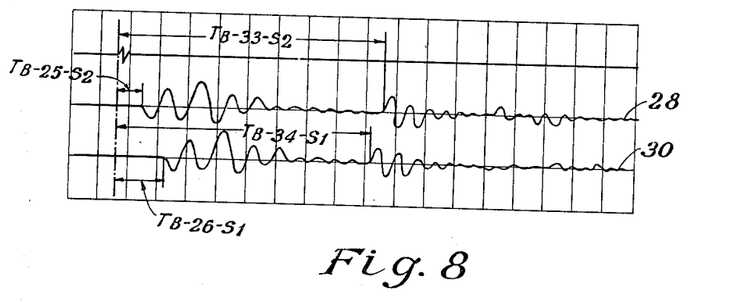

Sample records from shots at A and B are given in Figures 7 and 8 respectively, showing the data from which the weathering correction is computed. The top trace in each record gives an indication of the instant of detonation of the explosive. Trace 27 in Figure 7 and trace 30 in Figure 8 are the records from seismometer $S_1$, while traces 28 and 29 are from seismometer $S_2$. Figures 7 and 8 are marked to show the times of waves traversing various paths shown in Figure 6. The vertical lines are timing lines printed on the record at convenient intervals, usually every 0.01 second, by some sort of timing device so that the time intervals between events can be measured. The arrival of the reflected waves from the bed Y—Y' at the two seismometers can be seen. They arrive much later than the refracted waves. From the difference between the two times $T_{A-31-S_2}$ and $T_{A-32-S_1}$, one value of the dip of bed Y—Y' can be made, and from the difference between $T_{B-33-S_2}$ and $T_{B-34-S_1}$, a second computation of the same dip can be made, which is entirely separate from the previous calculation and involves the use of the first record as well as the second only for the computation of the weathering correction.

If it is desired to correct the approximation that path 23—24 is equal to the path 25—26, the difference in weathering is first determined using the approximation. The difference between the lengths of the two paths is equal to the difference in weathering $(d_2 - d_1)$ multiplied by the tangent of the refraction angle $(\delta)$ with the vertical. Using the weathering difference obtained, this difference between paths 23—24 and 25—26 is ascertained. The corresponding time difference is determined from the velocity in the high velocity medium 18, applied to Equation (13), and a new value of $\Delta t$ is obtained. Usually one correction is all that is needed to give a value of $\Delta t$ closer than the readings on the records, even for a large difference in weathering. Of course, a second correction can be made in the same manner if desired.

The only requirement placed on the positions of the two seismometers $S_1$ and $S_2$ in the use of this method is that the instrument nearer the active hole must be placed far enough away from it so that the refracted wave is the first wave to reach the seismometer. If the velocity in the weathered layer 11 is $V_1$ and the velocity in the high velocity medium 18 is $V_2$, the minimum horizontal distance $x$ from the shot hole to the nearest seismometer is given very closely in terms of the depth of the shot hole $(h)$ by the equation $$x = \frac{V_1}{V_2} h \quad (15)$$

In practice a distance of 100 to 150 feet from the nearest instrument to the shot hole has been found to be entirely adequate. It is obvious that the effective spread of seismometers has been nearly doubled over that available with the McCollum and McGhee method using a given spacing between shot holes. For example, if the distance between shot holes is 1200 feet, the reflection spread using the McCollum and McGhee method is 600 feet, while the spread using our method may be any suitable distance up to a maximum of about 1000 feet. Thus, the conditions can be changed without drilling a new shot hole. On the other hand, we can also secure the advantage of having the nearest seismometer very near the shot hole, in that the first reflection on the record can be from a seismometer 100 to 150 feet from the shot point instead of 600 feet from it. With this arrangement the dip time bears a larger ratio to the normal move-out, giving a greater accuracy in the determinations. Again, the greater flexibility of spread gives greater possibility of placing the seismometers so that surface waves will not interfere with the reflections.

As has been previously stated, a separate and independent computation of the dip can be made from each reflection record. This gives the very important advantage that the results can be checked and obvious errors eliminated from every profile. This is impossible using the McCollum and McGhee method. Also, if difficulty is encountered so that reflections cannot be obtained from a shot in one hole, there is still the value of dip obtainable from the record produced by a shot in the other hole, and a small shot in the first hole will give all the data necessary to compute the weathering correction.

A further advantage resulting from the fact that two independent values of the dip of the stratum can be obtained is that by observing the discrepancy in determination of the dips from the two records, it can readily be ascertained whether or not the average velocity in the high velocity medium is in error. This is quite important, because in practice the average velocity in a certain structure is determined at a deep well penetrating the structure, and is applied over a wide region extending away from the well. This check on the average velocity gives a correction which may be very necessary if the velocity in the underlying formation varies over the region, as is often the case. This correction cannot be obtained using the McCollum and McGhee method.

No error can arise from the difficulty of obtaining the instant the seismic waves were generated in the shot holes, since no absolute time, but rather the difference in two times from the same shot is used. Thus, if there is an error in the time $T_{A-23-S_1}$ of 0.001 second, due to time break error, etc., this same error is present in $T_{A-24-S_2}$, and the difference between them eliminates this error.

Another advantage of the physical arrangement of shot holes and instruments shown in Figure 6 is that a second way of computing the weathering correction is available utilizing data from the reflection records. The results can be used as a check on the values found by the preferred refraction method above discussed.

Referring to Figure 6 it will be seen that if the seismometers are symmetrically placed, i. e. if seismometers $S_1$ and $S_2$ are equidistant from shot holes 10 and 19 respectively, and if shots A and B are at equal depths, paths A—31—$S_2$ and B—34—$S_1$ will be substantially equal in length. In fact if the weathered layer 11 were the same depth below seismometers $S_1$ and $S_2$ respectively, $T_{A-31-S_2}$ and $T_{B-34-S_1}$ would be equal to well within 0.001 second regardless of any normal dip of the reflecting stratum Y—Y'. Thus, when the depth of the weathered layer varies the difference in time required for waves to traverse the two paths A—31—$S_2$ and B—34—$S_1$ is (since the reflected waves travel nearly vertically, and since refraction at the weathered layer bends these waves still further into the vertical) practically entirely due to the difference in thickness of the weathered layer, i. e. the difference between $d_2$ and $d_1$. In other words:

$$T_{A-31-S_2} - T_{B-34-S_1} = Td_2 - Td_1 = \Delta t \qquad (16)$$

Of course, if the seismometers are not symmetrically placed or if the shots are not at the same depth, corrections can be made as will be apparent to those skilled in this art.

Thus from a correlation of the reflection data the weathering correction can be found. This method is very useful as a check of the refraction method of determining the weathering correction but is subject to the disadvantage that it involves correlation between records.

The methods as described in the simple case of one reflecting bed and two seismometers can, of course, be extended to more complicated cases of several beds and the use of a plurality of seismometers placed between the two mentioned. Moreover, other modifications will be apparent to those skilled in the art. We do not intend to be restricted by the specific embodiments shown and described but only to the subject matter of the appended claims which should be construed as broadly as the prior art will permit.

We claim:

1. A method of seismic surveying comprising drilling two spaced shot holes in the earth to depths at least as low as the bottom of the weathered formation, placing a spread of at least two seismometers near the surface of the earth, said seismometers being placed between and roughly in line with said shot holes, the seismometer spread occupying most of the distance between said shot holes, generating vibrations of the earth in one of said shot holes at a point at least as low as the bottom of the weathered formation, recording the instant of generation of said vibrations, recording the arrivals of the refracted waves and waves reflected from sub-surface formations at said seismometers, and repeating the operation using the second of said shot holes without altering the positions of said seismometers, whereby the weathering correction and the dip of said sub-surface formations can be determined accurately.

2. A method according to claim 1 in which said shot holes are approximately 1000 to 3000 feet apart.

3. A method according to claim 1 in which said shot holes are approximately 1000 to 3000 feet apart, one of the end seismometers of said spread is approximately 100 to 150 feet from the first of said shot holes and the other end seismometer of said spread is approximately 100 to 150 feet from the second of said shot holes.

4. A method of seismic surveying comprising drilling two spaced shot holes in the earth approximately 400 to 3000 feet apart to depths at least as low as the bottom of the weathered formation, placing a spread of at least two seismometers near the surface of the earth, said seismometers being placed between and roughly in line with said shot holes, the seismometer spread occupying most of the distance between said shot holes, generating vibrations of the earth in one of said shot holes at a point at least as low as the bottom of the weathered formation, recording the arrivals of the refracted waves and waves reflected from sub-surface formations at said seismometers, and repeating the operation using the second of said shot holes without altering the positions of said seismometers, whereby the weathering correction and the dip of said sub-surface formations can be determined accurately.

5. A method according to claim 4 in which said shot holes are approximately 1000 to 3000 feet apart, one of the end seismometers of said spread is approximately 100 to 150 feet from the first of said shot holes and the other end seismometer of said spread is approximately 100 to 150 feet from the second of said shot holes.

6. A method of seismic surveying comprising drilling two spaced shot holes in the earth to depths at least as low as the bottom of the weathered formation, placing a seismometer near the surface of the earth a distance from the first of said shot holes slightly greater than $$\frac{V_1}{V_2}h$$

where $V_1$ is the velocity of seismic waves in said weathered formation, $V_2$ is the velocity of seismic waves in the structure immediately underlying said weathered layer, and $h$ is the depth at which vibrations are to be generated in said shot hole, placing a second seismometer near the surface of the earth at a distance from the second of said shot holes approximately equal to the distance from the first of said shot holes to the first of said seismometers, such that the distance between seismometers is not greater than the distance between shot holes, generating seismic waves at a point in the first of said shot holes at least as low as the bottom of the weathered formation, recording the instant of generation of said waves, receiving and recording refracted waves and waves reflected from sub-surface strata after said waves have arrived at said seismometers, and repeating the operation using the second of said shot holes without altering the positions of said seismometers, whereby the weathering correction and the dip of said sub-surface strata can be determined accurately.

HENRY SALVATORI.
DEAN WALLING.